N. McQUEEN.
RIM STRUCTURE.
APPLICATION FILED DEC. 17, 1910. RENEWED JULY 3, 1912.
1,034,814.
Patented Aug. 6, 1912.
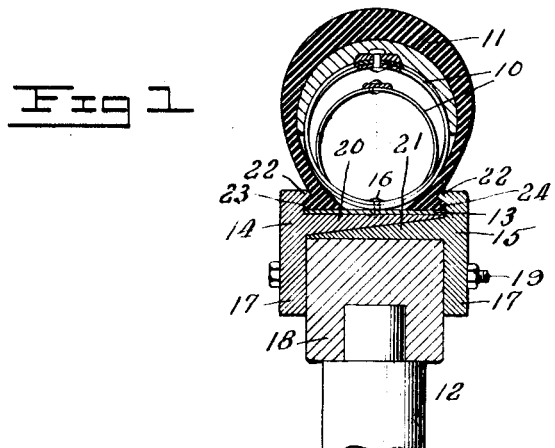
Fig 1.
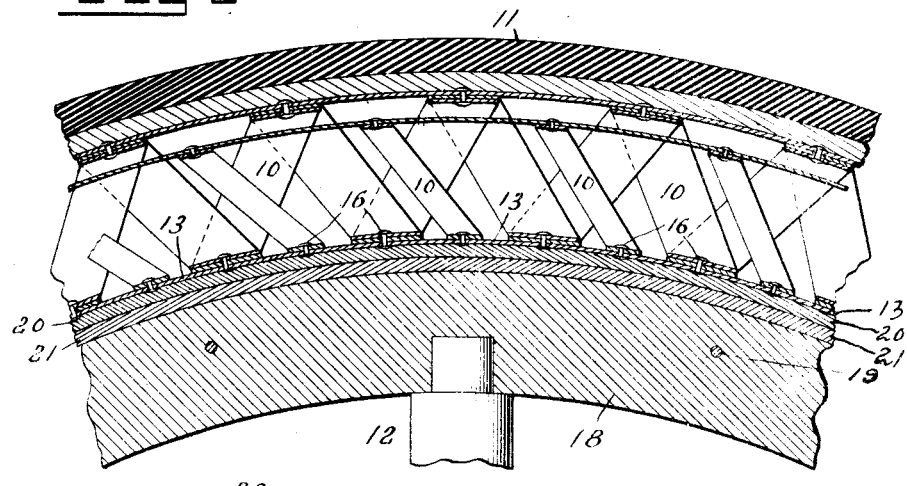
Fig 2.
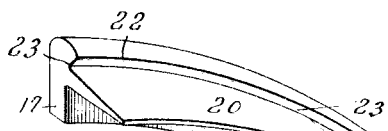
Fig 3.
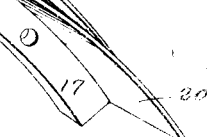
Witnesses
Inventor
Neill McQueen
By Meyers, Bushman & Rea
Attorneys

UNITED STATES PATENT OFFICE.

NEILL McQUEEN, OF LUDOWICI, GEORGIA.

RIM STRUCTURE.

1,034,814. Specification of Letters Patent. Patented Aug. 6, 1912.

Original application filed November 3, 1910, Serial No. 585,150. Divided and this application filed December 17, 1910, Serial No. 597,969. Renewed July 3, 1912. Serial No. 707,611.

*To all whom it may concern:*

Be it known that I, NEILL McQUEEN, a citizen of the United States, residing at Ludowici, in the county of Liberty and State of Georgia, have invented new and useful Improvements in Rim Structures, of which the following is a specification.

My invention consists of a rim structure particularly adapted for use in connection with automobile tires.

In application, Serial No. 585,150, filed by me Nov. 3, 1910, I have described this rim structure in connection with a particular form of spring cushion tire and this application is a division of that one mentioned. While of the particular relation and connection stated however, my invention may be used in other relations and connections without departing in any way from its generic spirit, and I desire it so understood.

The rim structure of my invention comprises, broadly, separable rim-clamping members adapted to engage and tightly clamp the projecting portions of a strip which is carried by the central or principal element of the tire which it is desired to secure to the wheel. The rim-clamping members are adapted to be clamped against the opposite sides of a wheel felly. The clamping members are still further formed so as to clamp an outer envelop on the tire. The outer envelop is provided with inner clenching edges, as is now common, or with edges of other suitable form.

I show in the accompanying drawings one specific embodiment of my invention, and in which drawings:—

Figure 1 is a transverse section of the rim structure and tire of my invention. Fig. 2 is a central peripheral section taken on the plane of the wheel. Fig. 3 is a perspective view of a portion of one of the rim clamping members, which members are preferably formed in sections.

The principal elements of the spring cushion tire consisting of a spring cushion structure 10 together with an outer envelop 11 are shown as attached to a wheel 12 by the rim structure of my invention. The spring cushion structure 10 and the outer envelop 11 are identically the same as those shown in my prior application, the convolutions of this spring cushion member being disposed transversely or at right angles to the circumference of the tire. An attaching strip 13 is used in connection with rim clamping members 14 and 15 for this purpose. The attaching strip in this embodiment is shown as made of comparatively thin material and as extending circumferentially around the entire wheel, and the spring cushion structure 10 is secured to it by rivets 16. However the attaching strip may be made of any dimensions desired, either as to thickness or as to extent. It occupies a position within the inner circle of the cushion structure 10 and preferably is of such width as to project laterally some distance from the rivets 16 or from the center.

The rim clamping members 14 and 15 are made in sections, as shown in Fig. 3. They consist of body portions 17 adapted to be bolted to the felly 18 of the wheel by bolts 19 which pass through the clamping members on opposite sides of the felly and through the body of the felly; of inwardly and laterally projecting wedge portions 20 and 21 and upwardly and inwardly turned flange portions 22. The wedge shaped portions 20 of the clamping members on one side of the wheel are tapered on one side, the underside, while the same portion 21 of the members on the other side of the wheel are tapered on the other side, that is the top side. In this manner the wedge shaped portions are adapted to overlie one another as clearly shown in Fig. 1, and to engage the attaching strip 16 and the wheel felly 18, respectively. By inturning the flanged portions 22 inner grooves 23 are made for the reception of the lateral edges of the attaching strip 13. The inturned flanged portions 22 overlie the edges of the strip 13 seated in the grooves 23 and the dimensions are such that spaces are left above the attaching strip 13 for the reception of inner clenching edges 24 of the outer envelop 11.

When the parts of the rim structure of my invention are suitably proportioned, the result is a most efficient structure. The tire may be most readily and simply applied, by simply loosening the bolts 19, parting the rim clamping members, preferably removing them on one side, placing the tire on the wheel, and then replacing the clamping member, whereupon the elements of the tire are engaged, as shown in Fig. 1, and then tightening up the bolts 19 to clamp the parts together and to the wheel. When the parts of the rim structure are properly proportioned the wedge portions 20 and 21 are made of such proportions as to be forced into firm contact with the wheel felly 18 and the attaching strip 13 when the members 14 and 15 are clamped in place, a most secure attachment of the tire and rim structure is had. Its attaching strip is forced tightly into the depths of the grooves and up against the edges 24 of the envelop 11, which envelop 11 is in turn forced inwardly toward the structure 10 and downwardly against the attaching strip 13. In use the band 13 may be laid upon the exterior face of the clamping member 14, when the members 14 and 15 are separated and then when they are assembled and brought home by means of the nut on the bolt 19, the said band 13 is properly positioned to be held and confined by the inwardly turned flange portion 42 of the elements 14 and 15. The great resulting advantage of such a rigid and secure structure and at the same time one so simply and easily applied and removed should at once be apparent.

While I have described the best form of my invention now known to me, it is of course obvious that many changes may be made, by those skilled in the art, without departing from the broad spirit of my invention. I therefore desire it understood that I intend to cover in the annexed claim all such modifications.

What I claim is:—

In a device of the character described, the combination with an inner tire portion having a relatively wide and flat base strip, a casing inclosing the tire portion and having its clencher edges resting on the base strip, and a supporting felly, a pair of flat rim sections engaging against the opposite sides of the felly and extending out therefrom and having inturned flanges on their outer edges overlapping the base strip and the clencher edges of the casing, the rim sections further having inwardly extending and overlapping wedge shaped portions interposed between the felly and the base strip to support the latter, the rim sections having grooves beneath the inturned flanges for the reception of the clencher edges, the groove in one of the sections being wider than the groove in the opposite section to receive the outer edge of the wedge portion of the opposite section beneath the adjacent clencher edge to bind the latter in the groove, and securing means for the rim sections to bind the same against the opposite sides of the felly.

In testimony whereof I have hereunto set my hand in presence of two subscribing witnesses.

NEILL McQUEEN.

Witnesses:
T. F. JOHNSTON,
J. BRUCE DANIEL.